United States Patent [19]

Ebata et al.

[11] Patent Number: 4,761,317
[45] Date of Patent: Aug. 2, 1988

[54] ABRASION RESISTANT ADHEREND

[75] Inventors: Yoshihiro Ebata; Tohru Komiyama, both of Kawanishi; Ryozo Hayami, Takarazuka; Masanori Koyama, Ikeda, all of Japan

[73] Assignee: Agency of Industrial Science & Technology, Tokyo, Japan

[21] Appl. No.: 84,223

[22] Filed: Aug. 12, 1987

[30] Foreign Application Priority Data

Aug. 14, 1986 [JP] Japan .......................... 61-125057[U]

[51] Int. Cl.$^4$ .............................................. B32B 3/16
[52] U.S. Cl. ...................................... 428/67; 428/446; 428/450; 428/492; 428/908.8
[58] Field of Search ................. 428/67, 450, 462, 465, 428/702, 492, 446, 908.8

[56] References Cited

U.S. PATENT DOCUMENTS 3,607,606  9/1971  Beninga ................................. 428/67

Primary Examiner—Alexander S. Thomas
Attorney, Agent, or Firm—Armstrong, Nikaido, Marmelstein & Kubovcik

[57] ABSTRACT

Disclosed is an abrasion resistant adherend, which comprises a vulcanized rubber layer and ceramic pieces juxtaposed and embedded in the rubber layer and in which the ceramic pieces are at least partly exposed out of the rubber layer and are provided with a penetrative sintering layer in such a portion thereof as being in contact with the rubber layer.

5 Claims, 1 Drawing Sheet

ABRASION RESISTANT ADHEREND

BACKGROUND OF THE INVENTION

The present invention relates to an abrasion resistant adherend to be used as a guide surface or frictional surface of such as a hopper for throwing or guiding ore thereon, a pulley for a belt conveyor and the like.

Conventional abrasion resistant adherends used for a guide surface or frictional surface of a hopper, a pulley for a belt conveyor, or the like include ones prepared by bonding ceramic pieces to the surface of a rubber layer of vulcanized natural or synthetic rubber with an adhesive and ones prepared by embedding ceramic pieces in an unvulcanized rubber layer in such a way as to expose the surface of the ceramic pieces and vulcanizing the rubber layer to hold the ceramic pieces in the rubber layer.

However, such adherends comprising ceramic pieces held in a vulcanized rubber layer with an adhesive or by vulcanization involve a demerit that ceramic pieces peel off or fall from the vulcanized rubber layer while a hopper or a pulley for a conveyor belt is being used, since the power of holding ceramic pieces by the vulcanized rubber layer is insufficient.

Peeling or falling of ceramic pieces is liable to occur particularly where an adherend is attached to a convex such as the surface of a pulley for a belt conveyor. Thus, solution of such a problem has been desired.

SUMMARY OF THE INVENTION

A first object of the present invention is to provide an adherend comprising ceramic pieces firmly held in a vulcanized rubber layer.

A second object of the present invention is to provide an adherend which hardly allows ceramic pieces to peel off or fall where it is attached to a convex such as the surface of a pulley for a belt conveyor.

DESCRIPTION OF THE PREFERRED EMBODIMENTS

The present invention will now be described with reference to the attached drawings.

Figure 1:
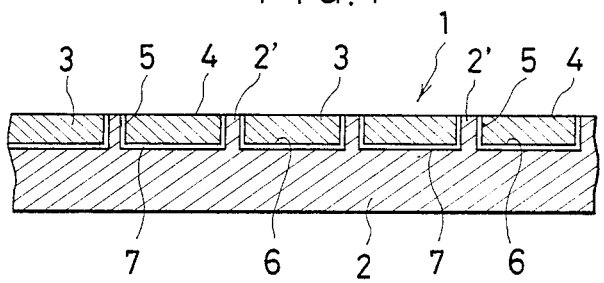
FIG. 1 is a cross-sectional view of an adherend according to a first embodiment of the present invention.
Figure 2:
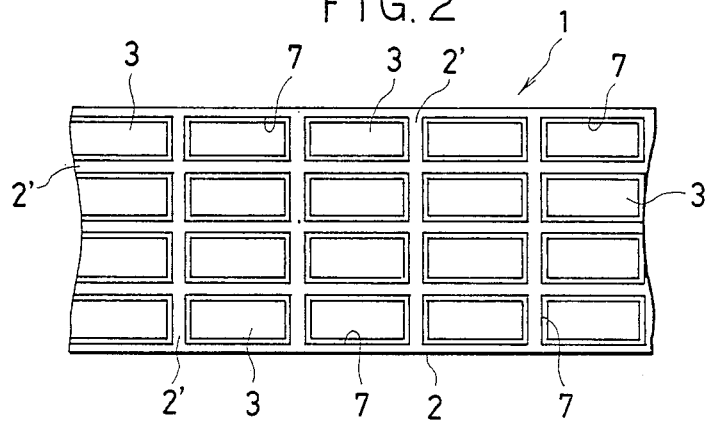
FIG. 2 is a plan view of FIG. 1.

In the first embodiment of the present invention shown in FIGS. 1 and 2, an adherend 1 is composed of a vulcanized rubber layer 2 and ceramic pieces 3 embedded in the vulcanized rubber layer 2.

The ceramic pieces 3 have at least a portion exposed out of the vulcanized rubber layer 2. In FIG. 1, the surfaces 4 of the ceramic pieces 3 are exposed from the vulcanized rubber layer 2, while the peripheral side surfaces 5 and bottom surfaces 6 of the ceramic pieces are in contact with the vulcanized rubber layer 2.

Thus, the adherend 1 can be endowed with an abrasion or a wear resistance by exposing the ceramic pieces from the vulcanized rubber layer 2.

The thickness of the vulcanized rubber layer 2' located between adjacent ceramic pieces 3 may be selectively set, and is chosen, for example, so as to allow the adherend to easily deform where the adherend is attached to a curved surface.

In FIG. 1, the surfaces 4 of the embedded ceramic pieces 3 are on substantially the same plane as that of the vulcanized rubber layer 2'.

An important feature of the present invention consists in the formation of a penetrative sintering layer 7 on the surface of each ceramic piece 3 in contact with the vulcanized rubber layer 2.

The penetrative sintering layer 7 is a layer formed by sintering a copper compound on the ceramic surface.

The thickness of the penetrative sintering layer is usually 0.05 to 0.5 mm. The copper compound penetrates into the ceramic piece, while it affords an uneven surface on the surface of the ceramic piece.

FIGS. 1 and 2 show the penetrative sintering layer 7 formed both on the peripheral side surface 5 and on the bottom surface 6 of the ceramic piece 3 in contact with the vulcanized rubber layer 2.

In FIGS. 1 and 2, the thickness of the sintering layer 7 is exaggerated.

The shape and size of ceramic pieces 3, and the shape of a portion exposed from the vulcanized rubber layer 2 are not limited and may be appropriately chosen according to the use of the adherend.

In FIGS. 1 and 2, ceramic pieces in the form of a square or a rectangle having a length of a side of 25 mm and a thickness of 10 mm are embedded in the vulcanized rubber layer 2, and the exposed surfaces of the ceramic pieces are square or rectangular.

The number of ceramic pieces 3 to be embedded in the rubber layer 2 is appropriately chosen according to the use of the adherend. For example, in the use of the adherend as a guide surface or a frictional surface of a hopper, a belt conveyor or the like, it is preferable to closely and parallelly embed the ceramic pieces 3 in the vulcanized rubber layer 2 as shown in FIGS. 1 and 2 to set the area of the surfaces of the exposed ceramic pieces as large as possible in comparison with that of the vulcanized rubber surface.

The material of the vulcanized rubber layer 2 is appropriately chosen from natural and synthetic rubbers according to the use of the adherend 1. Various chemicals, which are usually added in vulcanization of rubber, can be appropriately added to the rubber 2.

The ceramic material constituting the ceramic pieces is not particularly limited. Thus, commonly known ceramics can be used.

In the production of the adherend of the present invention, a penetrative sintering layer 7 is first formed on the surface of each ceramic piece to be in contact with the vulcanized rubber 2.

Subsequently, ceramic pieces 3 having a penetrative sintering layer 7 thus formed are embedded in an unvulcanized rubber as shown in FIGS. 1 and 2, and vulcanized in a mold to obtain a desired adherend 1.

Although there are various processes which are employable for the forming of a penetrative sintering layer 7 such as a Telefunken process and a hotpress process, the following processes A to D are advantageous in that the procedure is simple and that the bonding strength between the vulcanized rubber layer 2 and the ceramic piece 3 is high.

Process A: A paste of a copper sulfide powder is applied on a ceramic piece, and a paste of a copper powder is applied on the surface of the copper sulfide coating, followed by heating in an oxidizing atmosphere (Japanese patent application Kokai publication No. 56-155074).

Process B: A paste of copper and copper sulfide powder is applied on a ceramic piece, followed by heating in an oxidizing atmosphere (Japanese patent application Kokai publication No. 56-155074).

Process C: A paste of a copper powder is applied on a ceramic piece, followed by heating in an oxidizing atmosphere (Japanese patent application Kokai publication No. 55-90478).

Process D: A paste of copper powder is applied on a ceramic piece, and a paste of a metallic powder other than copper powder is applied on the copper coating, followed by heating in an oxidizing atmosphere (Japanese patent application Kokai publication No. 55-90478).

Even if the penetrative sintering layer 7 formed on the surface include any oxidized portions, it is unnecessary to reduce these portions.

Figure 3:
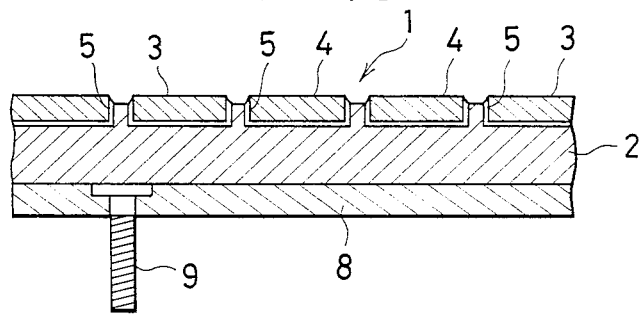
FIG. 3 is a cross-sectional view, showing a second embodiment of the invention.

FIG. 3 shows a second embodiment of the present invention. The adherend 1 is constituted of a vulcanized rubber layer 2 and ceramic pieces 3 embedded in the rubber layer. Further, a metallic plate 8 is bonded to the vulcanized rubber layer 2 and a bolt 9 is provided in the metallic plate 8.

Bonding of the vulcanized rubber layer 2 to the metallic plate 8 may be done simultaneously with vulcanization of unvulcanized rubber, or may be done with an adhesive.

Attachment of the adherend 1 to the surface of an object is facilitated by preparing the adherend 1 bonded to a metallic plate 8 having a bolt 9 provided therein.

In this second embodiment, each ceramic piece 3 is protruded from the vulcanized rubber layer 2 so that the surface 4 and a part of the peripheral side surface 5 of each ceramic piece are exposed.

As described above, in the adherend of the present invention, a penetrative sintering layer is formed on the surface of each ceramic piece in contact with the vulcanized rubber layer in which the ceramic piece is embedded.

Since the penetrative sintering layer has an uneven surface as described hereinabove, its surface area is remarkably increased and is at least several times as large as that of a ceramic piece having no penetrative sintering layer.

Since the surface area is thus increased, an excellent bonding strength can be obtained which is at least 3 to 5 times as high as that in the case where ceramic pieces are bonded to the rubber layer by mere vulcanization or with an adhesive.

Since the ceramic pieces are firmly bonded to the rubber layer, an adherend having an excellent abrasion or wear resistance is obtained. Even if the adherend is attached to a convex and used under bending stress, the ceramic pieces neither peel off nor fall from the rubber layer in the vicinity of the surface of the adherend. Thus, the adherend can be stably used for a long period of time.

We claim:

1. An adherend comprising a vulcanized rubber layer and ceramic pieces embedded in said rubber layer, wherein said ceramic pieces are exposed at least in part from said vulcanized rubber layer and have a penetrative sintering layer in the portion thereof in contact with said vulcanized rubber layer.

2. An adherend as claimed in claim 1, wherein the exposed parts of said ceramic pieces are planar.

3. An adherend as claimed in claim 1, wherein a plurality of said ceramic pieces are parallelly embedded in said vulcanized rubber layer.

4. An adherend as claimed in claim 1, wherein the exposed portions of said ceramic pieces are on substantially the same plane as said vulcanized rubber.

5. An adherend as claimed in claim 1, wherein the exposed parts of said ceramic pieces protrude from the surface of said vulcanized rubber layer.

* * * * *